United States Patent
Sze et al.

(10) Patent No.: US 9,696,145 B2
(45) Date of Patent: Jul. 4, 2017

(54) OPPORTUNISTIC STRUCTURED LIGHT

(71) Applicant: Texas Instruments Incorporated, Dallas, TX (US)

(72) Inventors: Vivienne Sze, Cambridge, MA (US); Goksel Dedeoglu, Plano, TX (US); Vinay Sharma, San Francisco, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 330 days.

(21) Appl. No.: 14/185,562

(22) Filed: Feb. 20, 2014

(65) Prior Publication Data
US 2014/0333765 A1    Nov. 13, 2014

Related U.S. Application Data

(60) Provisional application No. 61/822,600, filed on May 13, 2013.

(51) Int. Cl.
*G01B 11/25* (2006.01)

(52) U.S. Cl.
CPC ................ *G01B 11/25* (2013.01)

(58) Field of Classification Search
CPC ................................... G01B 11/254
See application file for complete search history.

(56) References Cited

U.S. PATENT DOCUMENTS

| | | | |
|---|---|---|---|
| 7,385,708 B2 | 6/2008 | Ackerman et al. | |
| 8,480,237 B2* | 7/2013 | Tamura | G03B 21/005 348/746 |
| 2009/0244090 A1* | 10/2009 | Zhang | G06K 9/2036 345/619 |
| 2010/0188333 A1 | 7/2010 | Capps | |
| 2010/0272183 A1* | 10/2010 | Kamp | H04N 19/00703 375/240.16 |
| 2010/0299103 A1* | 11/2010 | Yoshikawa | G06T 7/0057 702/167 |
| 2012/0176341 A1 | 7/2012 | Dedeoglu et al. | |
| 2012/0183056 A1* | 7/2012 | He | H04N 19/33 375/240.12 |
| 2013/0028531 A1* | 1/2013 | Sato | H04N 19/60 382/233 |

(Continued)

OTHER PUBLICATIONS

Weipeng Xu et al, "Real-Time Keystone Correction for Hand-Held Projectors with an RGBD Camera", 20th IEEE International Conference on Image Processing (ICIP), pp. 3142-3146, Melbourne, Victoria, Australia, Sep. 15-18, 2013.

(Continued)

*Primary Examiner* — Nam Pham
(74) *Attorney, Agent, or Firm* — Gregory J. Albin; Charles A. Brill; Frank D. Cimino

(57) ABSTRACT

A method for using structured light in a handheld projection device is provided that includes projecting a structured light pattern in at least one portion of a frame being projected by the handheld projection device, wherein the at least one portion of the frame is a subset of the frame, capturing an image of the projected frame, computing scene depth information based on the structured light pattern in the captured image, and using the scene depth information in processing of a subsequent frame of the video stream.

20 Claims, 5 Drawing Sheets

(56) References Cited

U.S. PATENT DOCUMENTS

| | | | |
|---|---|---|---|
| 2013/0076909 A1* | 3/2013 | Marti | G06F 3/002 348/164 |
| 2013/0136172 A1* | 5/2013 | Lim | H04N 19/196 375/240.03 |
| 2013/0235212 A1* | 9/2013 | Nakashin | H04N 17/00 348/177 |

OTHER PUBLICATIONS

"Using the DLP Pico 2.0 Kit for Structured Light Applications", DLPA021A, Texas Instruments Incorporated, Jan. 2010, revised Oct. 2011, pp. 1-21.

* cited by examiner

OPPORTUNISTIC STRUCTURED LIGHT

CROSS-REFERENCE TO RELATED APPLICATIONS

This application claims benefit of U.S. Provisional Patent Application Ser. No. 61/822,600, filed May 13, 2013, which is incorporated by reference herein in its entirety.

BACKGROUND OF THE INVENTION

Field of the Invention

Embodiments of the present invention generally relate to using opportunistically placing structured light in projected frames.

Description of the Related Art

Hand-held projectors, such as the DLP (Digital Light Processing) Pico Projector available from Texas Instruments, are gaining in popularity as such projectors are increasingly becoming available in light-weight portable consumer electronic devices such as smart phones and cameras. The projector on these devices may be used as a display mechanism to project digital content onto any suitable surface.

In such hand-held projectors, the position and orientation of the projector may change during projection. Thus, tracking the relative surface depth and orientation and adapting the projected images dynamically without interrupting the video projection is desirable. For example, perspective distortion of the display images may result when the projector is not held perfectly perpendicular to the projection surface. This distortion is sometimes referred to as keystone distortion. A telltale artifact of keystone distortion is that a rectangle in the projector plane appears as a non-right-angled quadrilateral on the projection surface. If the orientation of the surface is known, the video content can be pre-warped on the projector's plane such that when projected onto the surface, the content appears to be aligned (or rectified) to the viewer.

Structured light can be used to measure depth by projecting a known pattern onto the world. The reflection of the pattern is captured by a camera and the depth profile of the environment can be computed based on triangulation between the known projected pattern and the image of the distorted pattern as captured by the camera. In the case of a light projector, the depth and orientation of the projection surface relative to the projector can be used to manipulate the projection content to satisfy various criteria. Examples include ensuring that the content is keystone corrected, remains in focus, or is of a constant size.

A commonly used method of applying structured light when projecting video is to replace several frames in the video with structured light frames (i.e., to steal frames). The projector and camera are synchronized such that the camera knows when to expect to see the pattern of the structured light. In addition, by designing pairs of structured light patterns that are the inverse of each other, the structured light can be rendered "invisible" to human observers. One drawback of replacing or stealing frames from the projected video for structured light is that the brightness or darkness of the projected video is reduced, which may deteriorate the viewing experience. For instance, a white-dark frame pair will add a constant grey brightness level to the video content, thus reducing contrast. In addition, in order to work well, this approach requires a projector and camera capable of operating at high speeds and in perfect synchronicity.

SUMMARY

Embodiments of the present invention relate to methods, apparatus, and computer readable media for using opportunistically placing structured light in projected frames. In one aspect, a method for using structured light in a handheld projection device is provided that includes projecting a structured light pattern in at least one portion of a frame being projected by the handheld projection device, wherein the at least one portion of the frame is a subset of the frame, capturing an image of the projected frame, computing scene depth information based on the structured light pattern in the captured image, and using the scene depth information in processing of a subsequent frame of the video stream.

In one aspect, a handheld projection device configured to used structured light is provided that includes a projector for projecting a structured light pattern in at least one portion of a frame being projected by the projector, wherein the at least one portion of the frame is a subset of the frame, a camera for capturing an image of the projected frame, means for computing scene depth information based on the structured light pattern in the captured image, and means for using the scene depth information in processing of a subsequent frame of the video stream.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
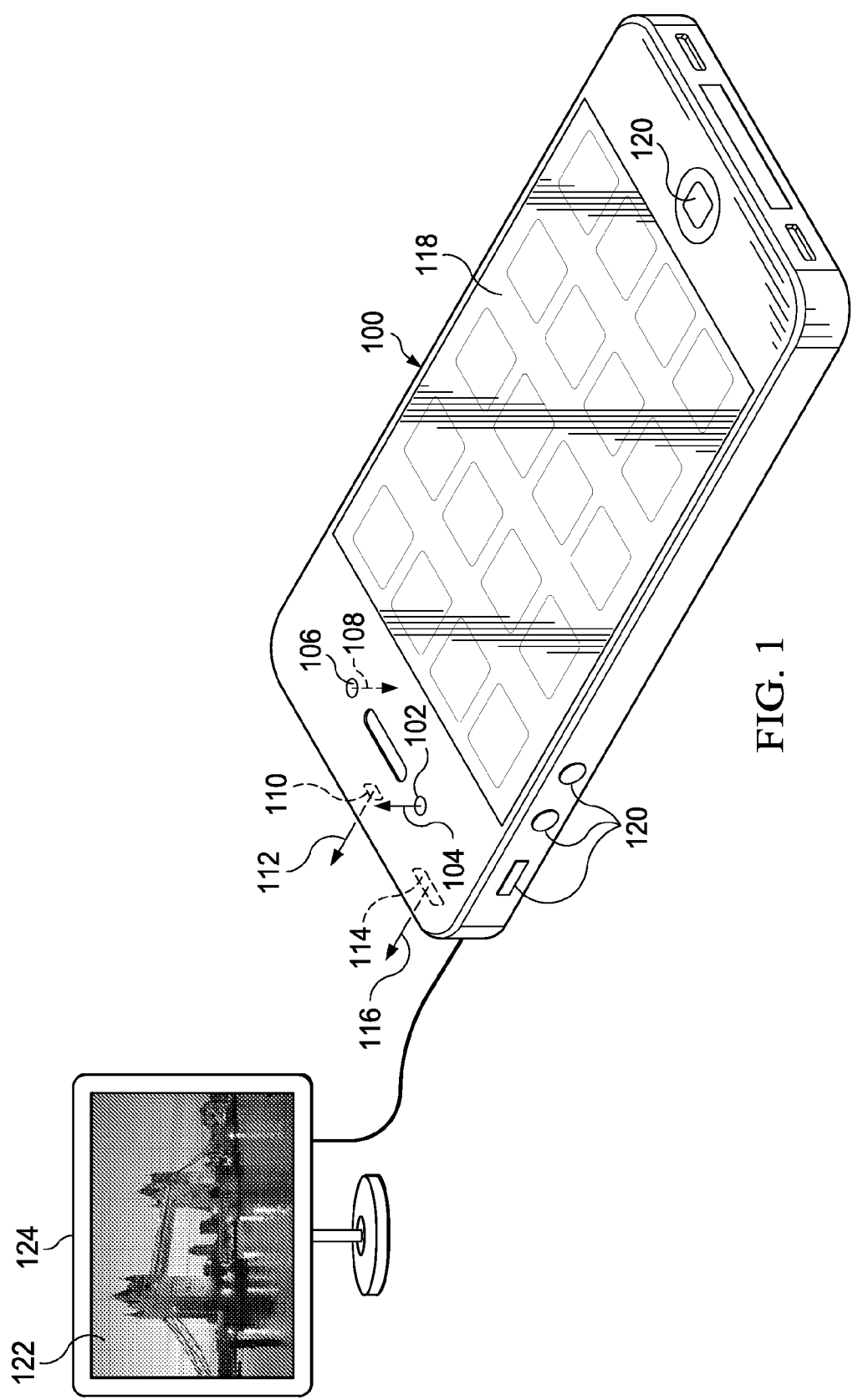
FIG. 1 is a perspective view of an example handheld projection system configured to opportunistically place structured light in projected frames.

Specific embodiments of the invention will now be described in detail with reference to the accompanying figures. Like elements in the various figures are denoted by like reference numerals for consistency.

As previously mentioned, structured light may be used in handheld projection devices to determine the depth and orientation of the projection surface relative to the projector. In the prior art, structured light data is captured during projection by replacing entire video frames with structured light frames. Embodiments of the invention provide for using opportunistically placed structured light in projected content. The opportunistically placed structured light replaces a subset of a projected frame rather than replacing an entire frame as in the prior art. The opportunistically placed structured light is used to dynamically estimate the relative depth and orientation of the projection surface with respect to the projector. The depth and orientation may then be used to manipulate the projection content, for example to perform keystone correction, focus correction, and/or size adjustment.

FIG. 1 is a perspective view of an example handheld projection device 100 configured to opportunistically place structured light in frames of a projected video stream. More specifically, the handheld projection device 100 is configured to execute an embodiment of a method for opportunistically placing structured light in frames of a projected video stream as described herein. In this example, the handheld projection device 100 is embodied in a mobile smart phone. As shown in FIG. 1, the handheld projection device 100 includes a front-facing camera 102 (on the front of the system 100) that points in the direction indicated by arrow 104, a rear-facing camera 106 (on the back of the system 100) that points in the direction indicated by arrow 108 (substantially opposite the direction of arrow 104), and a top-facing camera 110 (on the top edge of the system 100) that points in the direction of arrow 112 (substantially orthogonal to the directions of arrows 104 and 108). In some embodiments, one or both of the front-facing camera 102 and the rear-facing camera 106 may not be present.

The handheld projection device 100 also includes a projector 114 (on the top edge of the system 100) that points in the direction of arrow 116 (substantially parallel to the direction of arrow 112). The projector 114 is configured to project a video stream 122 onto a surface 124 under the control of the device 100. The projector 114 is also configured to project structured light patterns onto the projection surface 124 under the control of the device 100 during the projection of the video stream 122. In some embodiments, the projector 114 is a light projector (e.g., pico projector) that is suitable for projecting a video stream 122 onto a projection surface 124 under control of the device 100. An example of one suitable light projector is a DLP (Digital Light Processing) Pico Projector available from Texas Instruments, Inc. The use of a DLP pico projector to project structured light patterns is well known. For example, use of a DLP pico projector for structured light applications is described in the Texas Instruments application report "Using the DLP Pico 2.0 Kit for Structured Light Applications", DLPA021A, January 2010 (revised October 2011), available at www.ti.com/lit/an/dlpa021a/dlpa021a.pdf.

The top-facing camera 110 is configured to have a field of view (FOV) that substantially overlaps the FOV of the projector 114 such that the camera 110 can capture images of the video stream 122 being projected on the projection surface 124.

The handheld projection device 100 also includes a touch screen 118 (on the front of the system 100) and various buttons 120 for manually controlling operations of the device 100.

Figure 2:
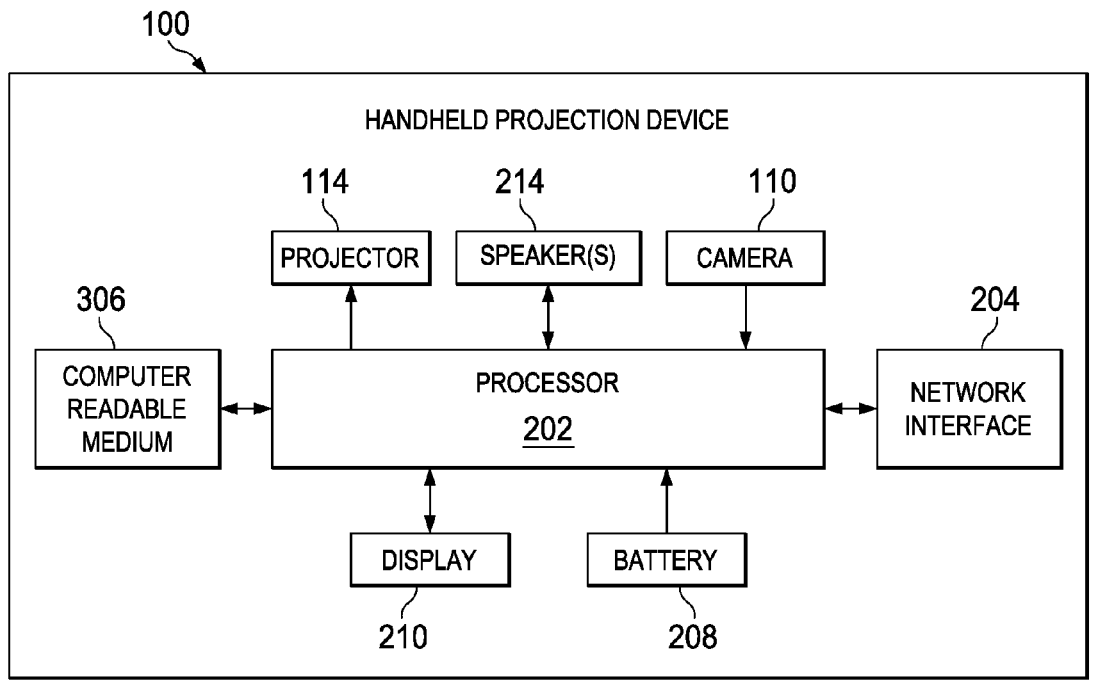
FIG. 2 is a block diagram of the handheld projection system of FIG. 1.

FIG. 2 is a block diagram of the handheld projection device 100. The device 100 includes various electronic circuitry components for performing system operations implemented in a suitable combination of software, firmware and hardware. Such components include a processor 202 (e.g., one or more microprocessors and/or digital signal processors) for executing software instructions that implement at least some system operations, a network interface 204 for communicating information to and from a network in response to signals from the processor 202, and a computer-readable medium 206, such as a nonvolatile storage device and/or a random access memory ("RAM") device, for storing software instructions programs and other information. The device 100 also includes a battery 308 providing power for the device 100, a display 210 that includes a screen for displaying information to a user and for receiving information from the user in response to signals from the processor 202, speaker(s) 214 for outputting sound waves in response to signals from the processor 302, the projector 114, and the camera 110. For simplicity, the other cameras of device 100 are not shown.

As shown in FIG. 2, the processor 202 is connected to the computer-readable medium 206, the battery 208, and the display device 210, the speaker 214, the projector 114 and the camera 110. For clarity, although FIG. 2 shows the battery 208 connected to only the processor 202, the battery 208 may be further coupled to various other components of the device 100. Also, the processor 202 is coupled through the network interface 204 to a network (not specifically shown), such as the Internet or an intranet. For example, the network interface unit 204 communicates information by outputting information to, and receiving information from, the processor 202 and the network, such as by transferring information (e.g., instructions, data, signals) between the processor 202 and the network (e.g., wirelessly or through a USB interface).

In response to executing software instructions stored in the computer readable medium 206, the processor 202 causes the projector 114 to project the video stream 122 on the projection surface 124 and to opportunistically add structured light patterns to frames of the projected video stream. The processor 202 also further causes the camera 110 to capture images of the scene, i.e., the projected video frames 122 on the projection surface 124. The processor 202 further executes software instructions to cause the computation of the depth of the scene from the opportunistically added structured light patterns in each of the captured images, and to use the computed scene depths to perform processing on the projection content such as keystone correction, focus correction, and/or size adjustment. More specifically, in response to executing stored software instructions, the processor 202 causes the method of FIG. 3 to be performed by the device 100.

Figure 3:
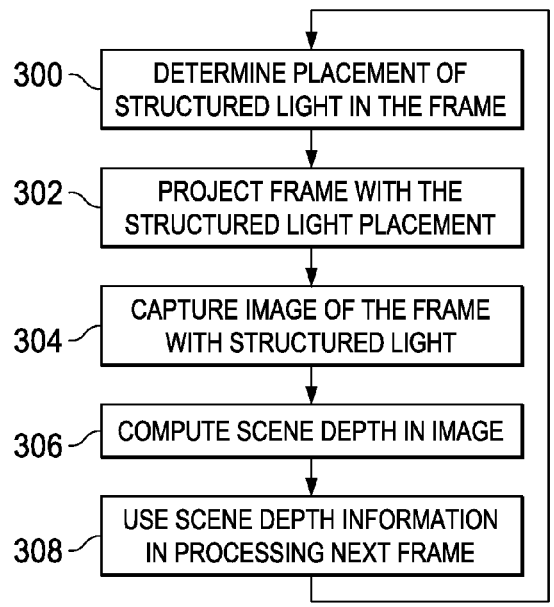
FIG. 3 is flow diagram of a method for opportunistically placing structured light in projected frames that may be executed by the handheld projection system of FIGS. 1 and 2.

FIG. 3 is a flow diagram of a method for opportunistically adding structured light to frames of a projected video stream that may be performed, for example, in the handheld projection device 100 of FIGS. 1 and 2. This method is executed continuously as the video stream 122 is projected on the surface 124, and operates on each frame of the video stream 122.

Initially, the placement of the structured light pattern in the current frame of the projected video stream 122, i.e., the next frame to be projected by the projector 114, is determined 300 by the processor 202. As was previously mentioned, the structured light pattern is placed in a subset of a video frame rather than replacing an entire frame (or frames) as in the prior art. Determination of the placement of the structured light pattern is described in more detail below.

The frame, with the addition of the structured light pattern at the determined placement, is then projected 302 by the projector 114 onto the surface 124. In embodiments in which the projector 114 is a DLP pico projector, the structured light pattern may be projected in the frame by replacing portions of some sequential DLP frames in the sequence of DLP frames forming the projected video frame with the structured light pattern, these portions corresponding to the determined placement in the video frame.

The camera 110, under control of the processor 202, captures 304 an image of the scene including the projection surface 124 and the projected frame with the structured light pattern. The processor 202 then executes instructions to cause the depth of the scene to be computed 306 based on triangulation between the known projected pattern and the image of the distorted pattern as captured by the camera. Any suitable technique for computing the scene depth may be used. Some suitable techniques are described, for example, in U.S. Pat. No. 7,385,708 B2, issued Jun. 10, 2008.

The processor 202 then uses 308 the computed scene depth information in the processing of the next frame of the video stream to be projected. For example, the processor 202 may execute instructions to use the scene depth map to perform keystone correction on the next frame if needed. Using a scene depth map to perform keystone correction is well known and any suitable technique may be used. One suitable technique is described in W. Xu, et al., "Real-Time Keystone Correction for Hand-Held Projectors with an RGBD Camera," Proceedings of $20^{th}$ IEEE International Conference on Image Processing (ICIP), pp. 3142-3146, September, 2013 ("Xu" herein). In another example, the processor 202 may execute instructions to use the scene depth map to perform focus correction on the projector 114. For example, random sample consensus (RANSAC) may be used to segment out the planar projection surface 124 from the depth map. One example of this process is described in Xu. Using this depth map, the distance from the projector 114 to the center of the projected image can be determined. Using calibration information of the lens of the projector 114, the computed distance can be used to change the lens focus as needed to keep the projected frames in focus.

Figure 6A:
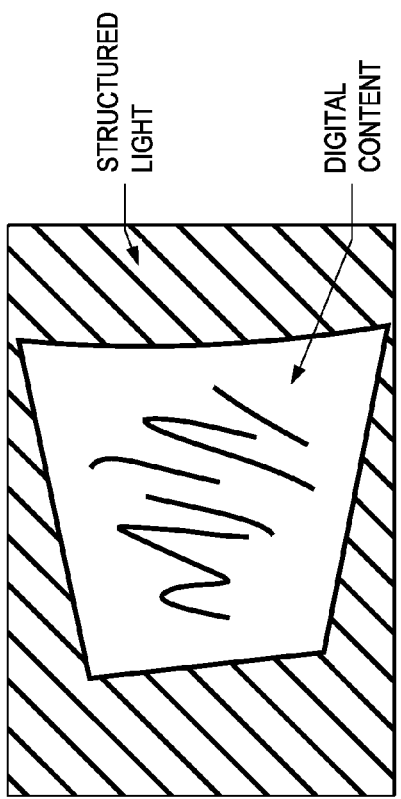

In some embodiments, the structured light pattern is placed at the borders of the video frames. In some such embodiments, the overall resolution of the projected video frames is reduced or the frame borders are cropped and the structured light pattern is placed in the border areas that would have otherwise been used for the video content. Thus, the structured light placement will be the same in each projected frame. This placement is illustrated in the example of FIG. 6A. In such embodiments, the processor 202 may determine the placement of the structured light pattern by causing the projector 114 to reduce the resolution of the projected video frames and to project the structured light pattern in the border pixels that are no longer used for video content.

Figure 4:
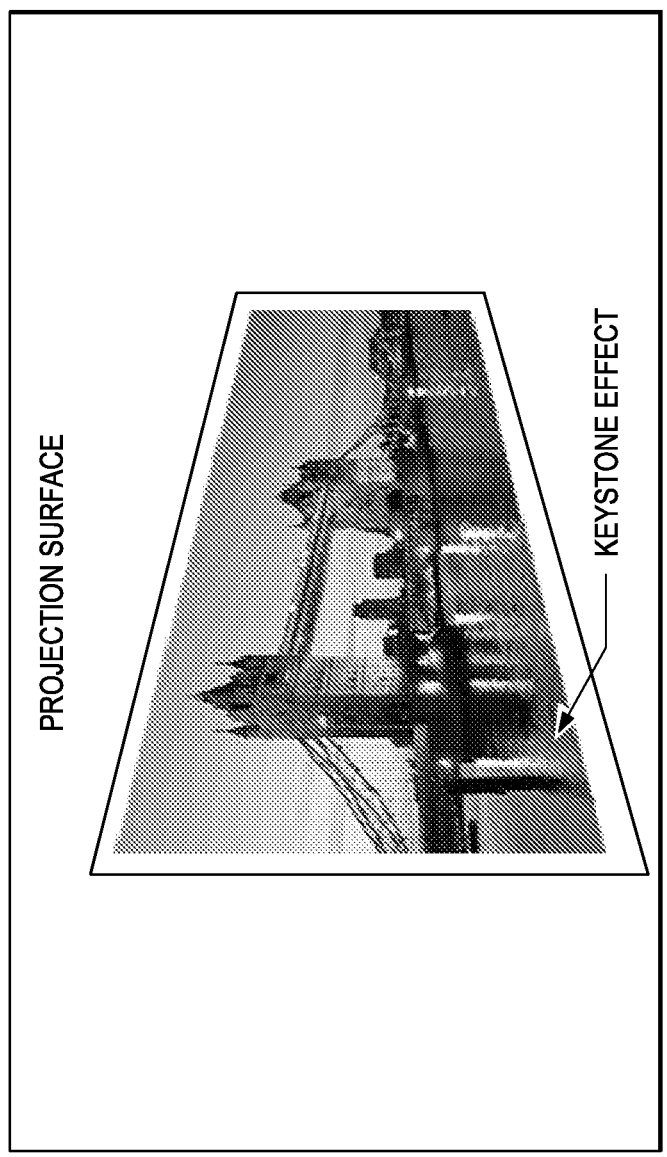
FIGS. 4, 5, and 6A-6D are examples.
Figure 4:
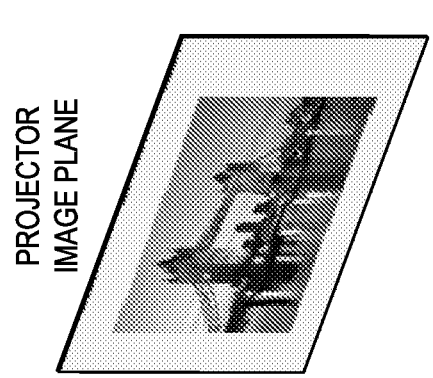
Figure 5:
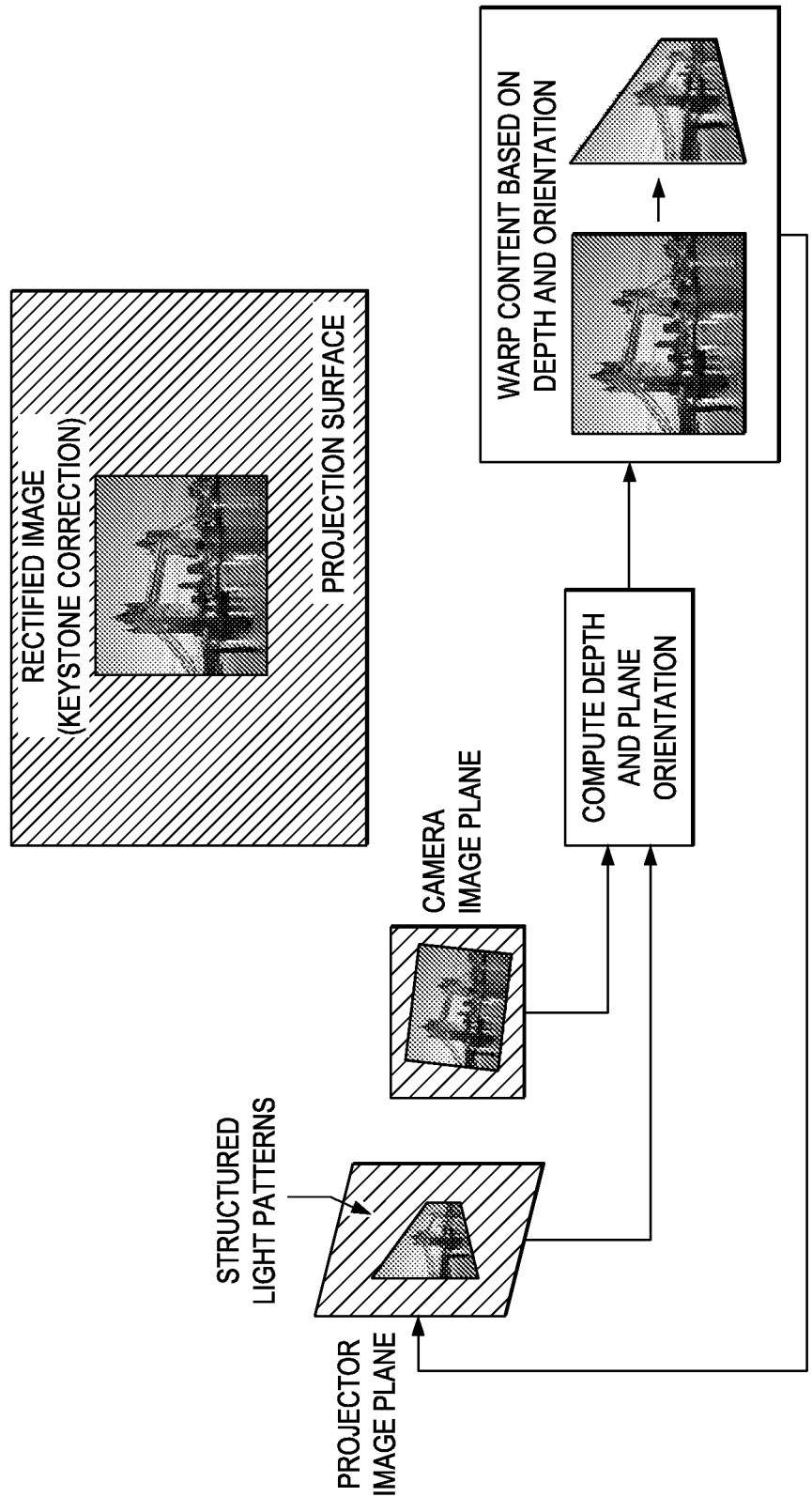
Figure 6B:
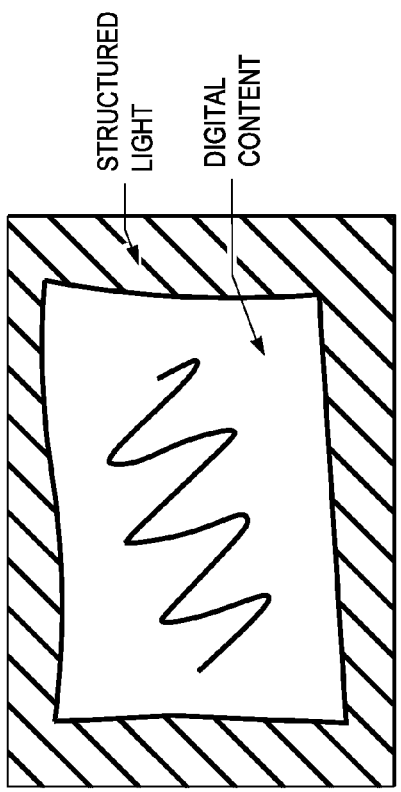
Figure 6C:
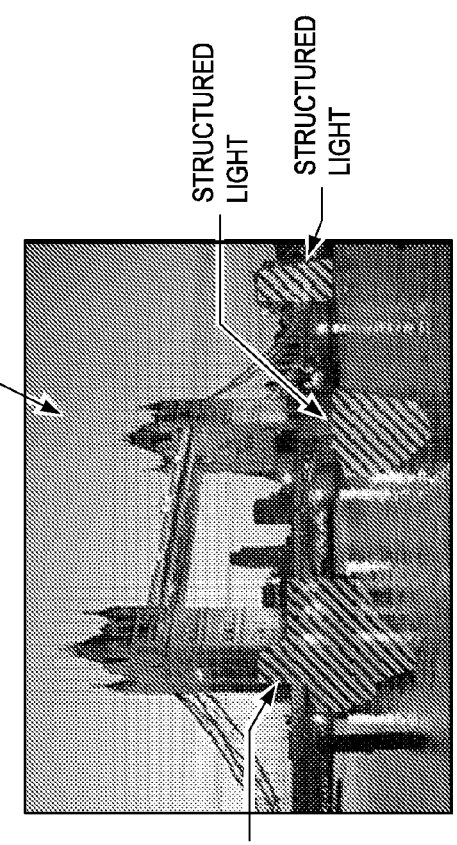

In some embodiments, the border placement of the structured light pattern is determined by the location of any keystone effect that may be present. More specifically, the structured light pattern is placed in areas of a video frame that do not correspond to video content due to pre-warping of the video content to compensate for the distortion. As is illustrated in the example of FIG. 4, when the projector is not perpendicular to the projection surface, the resulting projected image is skewed, or distorted. This perspective distortion is sometimes called the keystone effect. As is illustrated in the example of FIG. 5, if the orientation of the projection surface is known, the video content can be pre-warped on the plane of the projector such that when projected onto the projection surface, the video content appears to be aligned (rectified) to the viewer. As a result of pre-warping the video content (or 2D image), there are pixels in the projector plane that do not coincide with any content information. In the prior art, these pixels, which typically occur on the border of the video content, may be colored black so that the viewer does not see these regions. Thus, these pixel regions can be used for projecting structured light while simultaneously projecting video content through the rest of the projected pixels. The placement of structured light in response to pre-warping of video content is illustrated in the examples of FIGS. 6B and 6C.

In such embodiments, the processor 202 may determine the placement of the structured light pattern by executing instructions to detect the presence of any keystone effect, pre-warping the image to compensate for the distortion, and directing the projector 114 to project the structured light pattern in the border pixels that do not contain video content due to the pre-warping.

Note that in embodiments in which the structured light is placed in the borders of frames rather than in the content, the viewing experience is not adversely impacted (e.g., no loss of image contrast occurs).

Figure 6D:
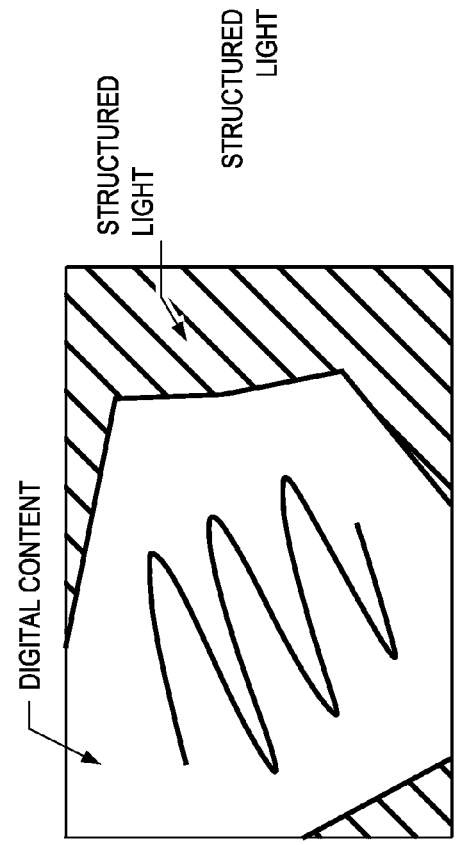

In some embodiments, the structured light pattern is embedded in one or more regions of the video content. In such embodiments, to determine the placement of the structured light in a frame, the processor 202 executes instructions to identify one or more suitable regions in the frame. Typically, a projected video stream has been compressed using block-based video compression (e.g., H.264/AVC or HEVC) and is decompressed before it is projected. Video compression is often a lossy process, which causes distortion in the decompressed images due to quantization. Thus, structured light can be "hidden" in regions of a frame where there is significant distortion. For example, a bit plane of structured light patterns covering only the identified regions of the frame may be inserted in the frame. The placement of structured light in one or more regions of the video content is illustrated in the example of FIG. 6D.

As the processor 202 executes instructions to decode frames of the video stream, the processor 202 may also execute instructions to estimate the distortion in blocks of a frame based on the syntax elements and/or other properties of the compressed video stream. For example, a suitable region(s) (one or more contiguous blocks) of distortion can be estimated based on the quantization parameter for each pixel block as well the values of the coefficients. Quantization parameters with high values are indicative of the presence of higher distortion. In another example, a suitable region(s) can be estimated based on the boundary strength of a deblocking filter, if present. The boundary strength is indicative of regions with potentially high blocking artifacts (distortion). Distortion also often occurs between intra-predicted blocks, or inter-predicted blocks with different motion vectors. Thus, in another example, a suitable region(s) can be estimated based on the difference between motion vectors of neighboring intra-predicted or inter-predicted blocks.

In another example, suitable region(s) can be estimated from explicit signaling in the compressed video. More specifically, when the video is encoded, the encoder can signal blocks of high distortion in the encoded video stream to indicate candidate regions for structured light placement. The processor 202 can execute instructions to decode the indicators of candidate regions and cause the projector 114 to project the structured light pattern in the indicated regions. In another example, a suitable region(s) can be estimated based on luminance, i.e., structured light can be added to a region(s) where the luminance is in the middle of the range (i.e., not too bright or dark). More specifically, luminance can range from 0 to 255. The processor 202 can execute instructions to cause the identification of a region(s) where the DC of the luminance is in the mid range and select such a region(s) for structured light placement.

The above approaches for placement of structured light in projected video frames will generate depth measurements for limited regions of the projection surface rather than for the entire surface. If the shape of the projection surface is of a known type, such as a plane or curved screen, the shape parameters can be estimated by fitting the shape model to the estimated depth measurements. Typically, the projection surface is planar, and a plane model can be readily fit to the sparse set of depth measurements obtained from the described approach. One approach for doing this is described in Xu.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which the handheld projection system is embodied in a mobile smart phone. One of ordinary skill in the art will understand embodiments in which the handheld projection system is, for example, a standalone projection device that includes a camera for capturing images of the projected video frames. One of ordinary skill in the art will also understand embodiments in which the handheld projection system is embodied in sleeve or clip-on unit that may physically coupled to a smart phone.

In another example, embodiments have been described herein in which the projector and the camera are placed on the top edge of the handheld projection systems. One of ordinary skill in the art will understand embodiment with differing placement of the projector and camera in the projection system. For example, the projector and camera may be place on the top or bottom of the projection system or on other edges so long as the FOV of the camera substantially overlaps that of the projector.

In another example, embodiments have been described here in which the projected frames are assumed to be from a video stream. One of ordinary skill in the art will understand embodiments in which the projected frames are individual frames, e.g., slides in a presentation.

Embodiments of the method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method for using structured light in a handheld projection device, the method comprising:
    replacing only a portion of a frame in a video stream with a structured light pattern, wherein the portion of the frame is less than all of the frame;
    projecting the frame including the structured light pattern for the portion of the frame and video content for other pixels of the frame with the handheld projection device;
    capturing an image of the projected frame;
    computing scene depth information based on the structured light pattern in the captured image; and
    using the scene depth information in processing of a subsequent frame of the video stream.

2. The method of claim 1, wherein using the scene depth information includes using the scene depth information to perform keystone correction on a next projected frame.

3. The method of claim 1, wherein the portion of the frame is a boundary of the frame.

4. The method of claim 3, wherein the portion of the frame includes boundary pixels determined based on a location of keystone distortion in the frame.

5. The method of claim 1, further comprising determining a location of the portion of the frame based on distortion in the frame caused by encoding the frame in an encoded video stream.

6. The method of claim 5, wherein determining a location includes estimating distortion in one or more contiguous blocks of the frame based on quantization parameters of the blocks signaled in the encoded video stream.

7. The method of claim 5, wherein determining a location includes estimating distortion in one or more contiguous blocks of the frame based on boundary strength of a deblocking filter.

8. The method of claim 5, wherein determining a location includes estimating distortion in one or more contiguous blocks of the frame based on differences between motion vectors of neighboring blocks.

9. The method of claim 5, wherein determining a location includes decoding indicators of regions of high distortion signaled in the encoded video stream.

10. The method of claim 1, wherein determining a location includes determining a location of the portion of the frame based on luminance.

11. A handheld projection device configured to use structured light, the device comprising:
    a projector;
    a camera;
    one or more processors coupled to the projector and camera, the one or more processors configured to:
        replace only a portion of a frame in the video stream with a structured light pattern, wherein the portion of the frame is less than all of the frame;
        cause the projector to project the frame including the structured light pattern for the portion of the frame and video content for other pixels of the frame;
        cause the camera to capture an image of the projected frame;
        compute scene depth information based on the structured light pattern in the captured image; and
        use the scene depth information in processing of a subsequent frame of the video stream.

12. The handheld projection device of claim 11, wherein the one or more processors are further configured to use the scene depth information to perform keystone correction on a next projected frame.

13. The handheld projection device of claim 11, wherein the portion of the frame is a boundary of the frame.

14. The handheld projection device of claim 13, wherein the portion of the frame includes boundary pixels determined based on a location of keystone distortion in the frame.

15. The handheld projection device of claim 11, wherein the one or more processors are further configured to determine a location of the portion of the frame based on distortion in the frame caused by encoding the frame in an encoded video stream.

16. The handheld projection device of claim 15, wherein the one or more processors are further configured to estimate distortion in one or more contiguous blocks of the frame based on quantization parameters of the blocks signaled in the encoded video stream.

17. The handheld projection device of claim 15, wherein the one or more processors are further configured to estimate distortion in one or more contiguous blocks of the frame based on boundary strength of a deblocking filter.

18. The handheld projection device of claim 15, wherein the one or more processors are further configured to estimate distortion in one or more contiguous blocks of the frame based on differences between motion vectors of neighboring blocks.

19. The handheld projection device of claim 15, wherein the one or more processors are further configured to decode indicators of regions of high distortion signaled in the encoded video stream.

20. The handheld projection device of claim 11, wherein the one or more processors are further configured to determine a location of the portion of the frame based on luminance.

* * * * *